UNITED STATES PATENT OFFICE.

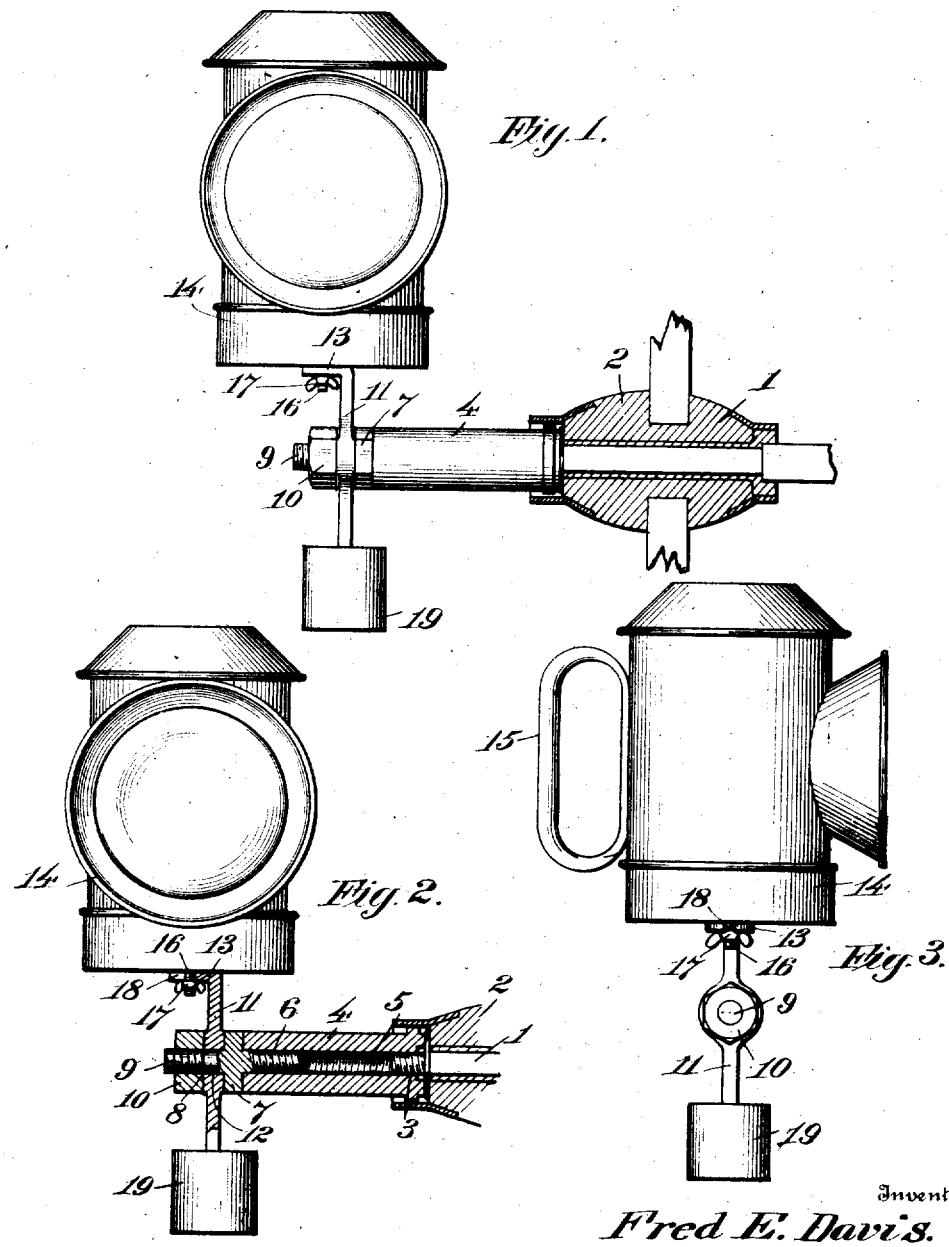

FRED EUSTACE DAVIS, OF BESSEMER, ALABAMA.

VEHICLE-LANTERN.

974,034.  Specification of Letters Patent.  Patented Oct. 25, 1910.

Application filed February 26, 1910. Serial No. 546,120.

*To all whom it may concern:*

Be it known that I, FRED E. DAVIS, a citizen of the United States, residing at Bessemer, county of Jefferson, and State of Alabama, have invented certain new and useful Improvements in Vehicle - Lanterns, of which the following is a specification.

My invention relates to vehicle lamps or lanterns and particularly to lamps or lanterns for road vehicles such as carriages, buggies and the like.

The object of my invention is to provide means for attaching a lamp or lantern to the end of the axle of a road vehicle whereby the light may be thrown directly on the road way without shining into the faces of either the driver or the horse.

A further object of my invention is to provide a device as mentioned in which the lantern may be turned to throw the light in any desired direction and in which the lantern may be readily detached to be used as a hand lantern.

A further object of my invention is to provide a device as mentioned equipped with means for maintaining the lamp in vertical position which is necessary when an acetylene lamp is used.

A further object is to provide a device as mentioned which will be of simple construction and easily secured in position, and which will not readily get out of order.

Other objects will appear hereinafter.

With these objects in view my invention consists generally in a member adapted to be secured on the end of an axle of a vehicle, an arm pivotally mounted thereon, means for securing a lamp on said arm and a counterweight for maintaining the lamp in vertical position.

My invention further consists in means for detachably and rotatably securing the lamp to the arm.

My invention further consists in various details of construction and arrangements of parts all as will be fully described hereinafter and particularly pointed out in the claims.

My invention will be more readily understood by reference to the accompanying drawings forming a part of this specification and in which—

Figure 1 is a front elevation of a lamp attachment embodying my invention in its preferred form, the hub of the adjacent wheel being shown in section, Fig. 2 is a similar view illustrating the attachment in vertical longitudinal section, and Fig. 3 is a side elevation of the same.

Referring now to the drawings 1 indicates the end of the front axle of an ordinary vehicle and 2 the hub of a wheel thereon, the end of the axle being threaded as at 3 to receive the ordinary bur or nut.

4 indicates a tubular member which is internally threaded as at 5 and adapted to be screwed upon the threaded end 3 of the axle. In placing the member 4 in position I prefer to remove the usual nut or bur, the said member taking the place of the same. The member 4 is of sufficient length to hold the lamp which is mounted at the end thereof from coming in contact with the wheel. Threaded into the end of the member 4 is a threaded rod 6 having an enlarged central portion 7 which is squared to form a wrench hold, and a smooth or unthreaded portion 8 adjacent the outer face of the portion 7. The outer end of the rod 6 is also threaded as at 9 to receive a nut 10.

Pivotally mounted upon the smooth portion 8 of the rod 6 is an arm 11 which is perforated intermediate its ends as at 12 to receive said rod as shown clearly in Fig. 2. The upper end of the arm 11 is bent at right angles into horizontal position as at 13 to form a seat or rest for a lamp 14, said lamp being of any preferred or ordinary construction and provided with a handle 15. The bottom of the lamp is provided with a depending pin 16 which is threaded to receive a thumb nut 17, and the portion 13 of the arm is slotted as at 18 to receive the pin 16. It is obvious that the lamp may be turned in any direction desired with the pin 16 as a pivot and by loosening the thumb nut 17 it may be readily removed for use as a hand lamp or lantern.

To maintain the lamp in vertical position irrespective of whether the vehicle is traveling up or down hill, which is important especially when an acetylene lamp is used, I provide the lower end of the arm 11 with a counterweight 19.

The device is of simple construction and may be readily secured to the axle of almost any road vehicle and it is obvious that it will not readily get out of order. The lamp will normally throw the light directly in the road way but may be turned at will in any direction and when desired may be removed and used as a hand light.

Having described my invention what I claim as new and desire to secure by Letters Patent is:

1. An attachment for vehicles comprising a member adapted to be threaded upon the end of an axle of a vehicle to extend in alinement with said axle and means for securing a lamp on said member, substantially as described.

2. An attachment for vehicles comprising a member adapted to be threaded upon the end of the axle and means for detachably and rotatably mounting a lamp thereon, substantially as described.

3. An attachment for vehicles comprising a member adapted to be threaded upon the end of the axle, an arm pivotally mounted on said member, a lamp attached to one end of said arm and a counterweight on the other end of said arm, substantially as described.

4. An attachment for vehicles comprising a tubular member internally threaded and adapted to be secured upon the end of an axle, a bearing member threaded in the outer end of said tubular member, an arm pivotally mounted on said bearing member, means for detachably and rotatably securing a lamp to one end of said arm and a counterweight on the opposite end of said arm, substantially as described.

In testimony whereof I have signed my name to this specification in the presence of two subscribing witnesses.

FRED EUSTACE DAVIS.

Witnesses:
  O. T. DICKEY,
  S. L. FLIPPIN.